United States Patent
Eck

(10) Patent No.: US 6,508,118 B1
(45) Date of Patent: *Jan. 21, 2003

(54) LEVEL TRANSMITTER FOR A LIQUID CONTAINER, AND METHOD FOR DETERMINING A LEVEL IN A LIQUID CONTAINER

(75) Inventor: Karl Eck, Frankfurt am Main (DE)

(73) Assignee: Mannesmann VDO AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,069

(22) Filed: Jul. 17, 2000

(30) Foreign Application Priority Data

Jul. 15, 1999 (DE) .......................................... 199 33 043

(51) Int. Cl.⁷ ............................. G01F 23/00; G08B 1/00
(52) U.S. Cl. ...................... 73/290 V; 340/623; 116/227
(58) Field of Search ........................... 73/290 R, 290 V, 73/313, 314; 340/620–623, 619; 116/227; 250/577

(56) References Cited

U.S. PATENT DOCUMENTS 3,256,738 A   6/1966  Di Giacomo et al. .......... 73/290
5,627,380 A * 5/1997  Crowne ...................... 250/577
5,723,870 A * 3/1998  Crowne et al. ............. 250/577

FOREIGN PATENT DOCUMENTS

| DE | 40 08 135 A1 | 3/1990 | ........... G01F/23/28 |
| DE | 198 20 167 A1 | 4/1998 | ........... G01F/23/26 |
| EP | 0690293 A2 | 3/1996 | ........... G01F/23/72 |

* cited by examiner

*Primary Examiner*—Hezron Williams
*Assistant Examiner*—Katina Wilson
(74) *Attorney, Agent, or Firm*—Mayer, Brown, Rowe & Maw

(57) ABSTRACT

A fuel level sensors eliminates lines to the sensor through the container wall. The novel level transmitter has a sensor made from magnetostrictive material which is stimulated to oscillate by an alternating magnetic field from a transceiver unit. These oscillations are detected by the transceiver unit, fed to an evaluation unit and used to form a signal for the level. The level transmitter and the method are particularly suitable in the case of use in fuel containers of motor vehicles.

10 Claims, 1 Drawing Sheet

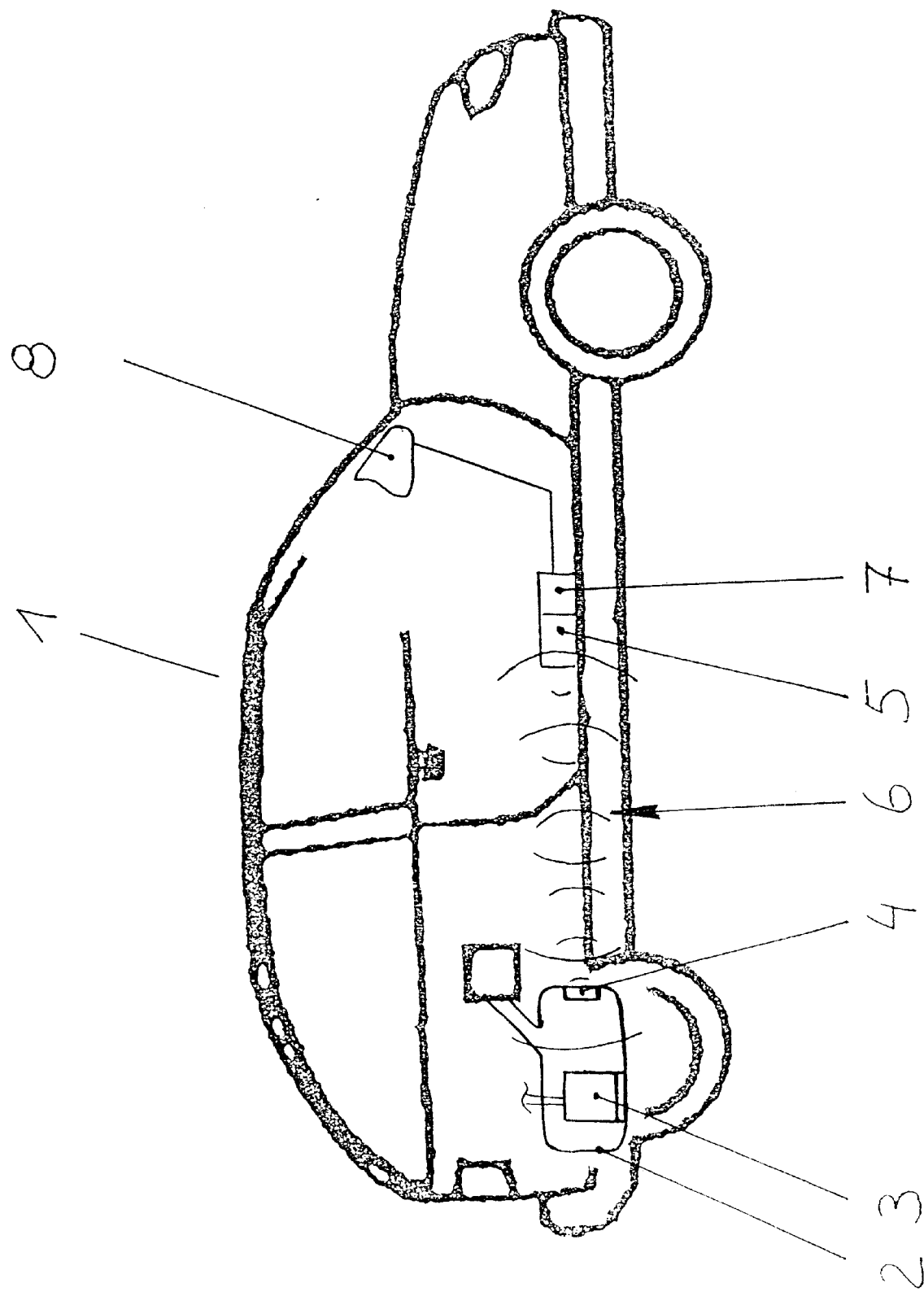

LEVEL TRANSMITTER FOR A LIQUID CONTAINER, AND METHOD FOR DETERMINING A LEVEL IN A LIQUID CONTAINER

BACKGROUND OF THE INVENTION

1. Field of the Invention

The present invention is directed to a level transmitter for a liquid container, preferably for a fuel container in a motor vehicle. More specifically, the present invention is directed to a fuel level transmitter having a sensor, and a method for determining a level.

2. Description of the Related Art

Level transmitters for determining levels in liquid containers are much used in practice and are therefore generally known. Two basic principles have been elaborated, particularly in the case of determining the level in fuel containers. Thus, the level can be detected by means of a float-actuated lever transmitter, or with the aid of an arrangement of a plurality of sensors fastened in the liquid container.

EP 0 690 293 A2, discloses level transmitters with magnetostrictive sensors for aircraft. The level transmitter comprises a tube with a float arranged in a fashion capable of vertical movement. A magnet is arranged in this float. Sensors made from magnetostrictive material are fastened in the tube at one end on a strip made from magnetic material. A wire-wound resistor is located at the opposite end of the sensors. If the float passes with the magnet into the region of the sensor, the sensor makes contact with the wire-wound resistor.

A measuring unit arranged on the bottom of the fuel container is used to determine the height of the level in the fuel container via the magnitude of the measured resistance. The great expense of this level transmitter is disadvantageous. The sensors must be fastened on magnetic material for their resetting. The overall measuring arrangement must be encapsulated, and is, moreover, arranged in a tube. Additional expenditure on assembly results from the fact that the tube must be fastened on the bottom of the fuel container.

When such a level transmitter is used in relatively small containers, for example for motor vehicles, there is, moreover, a reduction in the useful container volume to an extent which cannot be neglected.

It is the object of the invention to create a level transmitter and a method for determining a level. The level transmitter is to be of simple design and not susceptible to faults. Moreover, it is not to require any additional protective measures for electric lines or the evaluation unit. The level transmitter is to be capable of universal use, be easy to assemble and cost-effective. One goal of the method is to permit a level in a liquid container to be determined in a simple way.

SUMMARY OF THE INVENTION

In accordance with an exemplary embodiment of the invention, the level transmitter has a sensor made from magnetostrictive material which is arranged in a liquid container. The level transmitter also has a transceiver unit with an evaluation unit. The transmitter, which is constructed for producing an alternating magnetic field, applies this alternating magnetic field to the sensor. The sensor is set oscillating by the alternating field. In this case, use is made of the circumstance that in the case of a constant alternating field the oscillatory behavior of the sensor inside a liquid differs from that outside a liquid. The oscillations of the sensor are measured by the receiver and relayed to the evaluation unit. In the latter, a signal which corresponds to a level in the liquid container is formed from the oscillatory behavior of the sensor.

Some of the advantages of the level transmitter according to the invention consists in that it is only the sensor which remains arranged in the liquid container. All the other components of the level transmitter are arranged outside the container. Consequently, the useful container volume is no longer reduced, since the sensor has a magnitude of only a few square millimeters. Furthermore, there is no need for any sort of electric lines for the purpose of making contact or transmitting measured values in the liquid container.

Since it is now only the sensor which must be fastened in the container, the outlay on assembly is particularly low. In some circumstances, it is even possible to dispense with previously necessary separate openings in the liquid container.

A measuring method in the case of which no sorts of forces arise, for example, owing to movements of floats or levers, has been found with the aid of the method according to the invention. Consequently, the fastening of the sensor in the liquid container can be configured with particular ease. Because the transceiver unit detects measured values without the use of cables, the site of installation of all the other components of the level transmitter, except for the sensor, can be selected freely. This has the advantage, in turn, that the electrical components no longer have to be arranged in regions of danger to them, with the result that the susceptibility to faults is reduced, and the outlay for reliable operation is reduced.

The sensor can be mounted in a particularly simple way when it is fastened on the container wall of the liquid container. The fastening, for example, by bonding on or latching, can be in any desired way if it is ensured that the sensor is not restricted in its oscillation. It is particularly advantageous in this case to arrange the sensor on other built-in components of the liquid container. Thus, the outlay on assembling the sensor in the container is eliminated when the sensor is mounted, for example, on the outside of a delivery unit and is subsequently inserted with it into the liquid container.

In the case of the use of the sensor in liquid containers with aggressive media, it is advantageous to cover the sensor with a protective coating, for example a film, it then being necessary to take account of the influence of the coating on the oscillatory behavior of the sensor.

Because the arrangement of the transceiver unit can be selected freely, its arrangement at a central point is particularly favorable for electrical measuring and control devices, since the electric lines can be of very short design, and this leads to savings in weight and costs in addition to the better signal processing and transmission. However, it can also be advantageous in this case to arrange the transceiver unit separately in space.

In order to determine a signal for the level from the oscillatory behavior of the sensor, it is advantageous for the frequency of the alternating magnetic field to be selected such that the sensor oscillates at natural frequency. In another refinement of the method, it is not an alternating field with fixed frequency which is selected, but a frequency range in which the natural frequency of the sensor is situated. This frequency range is then traversed at intervals.

In this case, the natural frequency of the sensor in air or in the liquid can be selected as the natural frequency. The frequency, the amplitude and/or the decay time of the oscillation of the sensor are advantageously used to form the signal for the level. Whether the sensor is situated inside or outside the liquid can be determined very easily by comparing the measured values with the prescribed values of the sensor stored in the evaluation unit.

The frequency of the alternating field is preferably selected between 20 and 100 kHz. Since levels in liquid containers frequently vary very slowly, in another refinement of the method the level is determined not permanently, but at intervals.

The intervals can be a few milliseconds to a few minutes. Short measuring intervals are particularly advantageous whenever external influences, for example centrifugal forces, lead to falsified measurement results. For this purpose, the signals formed by the electronic evaluation system are not relayed immediately as the level signal, but averaged over time. The signal for the level is subsequently formed from the mean value. It is therefore possible to eliminate noise quantities effectively.

The invention will be explained in more detail with reference to an exemplary embodiment.

BRIEF DESCRIPTION OF THE DRAWINGS

FIG. 1 illustrates the level transmitter according to an exemplary embodiment of the invention incorporated into a motor vehicle.

DETAILED DESCRIPTION OF THE PREFERRED EMBODIMENTS

The motor vehicle 1 illustrated schematically in FIG. 1 has a fuel tank 2 in which there is arranged a delivery unit 3 for delivering the fuel from the fuel tank 2 to the engine (not illustrated) of the motor vehicle 1. A sensor 4 made from magnetostrictive material is bonded onto the inside of the fuel tank 2. A transceiver unit 5 is arranged in the front part of the motor vehicle 1.

The transceiver unit 5 produces an alternating magnetic field 6 at intervals of one second and thereby stimulates the sensor 4 to oscillate. The frequency of the alternating magnetic field is selected in this case such that the sensor 4 oscillates at natural frequency when it is not situated in the liquid. The frequency of the oscillations of the sensor 4 is picked up by the transceiver unit 5 and fed to an evaluation unit 7.

The measured frequency is compared in this evaluation unit 7 with a previously stored desired value which corresponds to the natural frequency of the sensor 4 in air. If the evaluation unit 7 does not determine any significant deviation of the measured value from the desired value, the evaluation unit 7 forms a first signal to the effect that the fuel reserve has been reached. This signal is initially buffered. The buffered first signals are averaged after a plurality of measuring cycles.

The mean value thus obtained is subsequently used to form a second signal which is then fed to a display unit 8 for the level. In addition to the level display in fuel tanks of motor vehicles, the invention also comprises, however, all other liquid containers in which a level is to be measured.

What is claimed is:

1. A method for determining a level in a liquid container comprising the steps of:

applying an alternating magnetic field to a sensor;

detecting oscillations of the sensor; and feeding the detected oscillations to an evaluation unit to form a signal representative of a level;

averaging the signals formed by the evaluation unit over time, wherein the signal for the level is determined from a mean value; and wherein the application of the alternating magnetic field and detection of oscillations is not accomplished through electrical wires connected to the sensor.

2. The method as claimed in claim 1, wherein the step of applying the alternating magnetic field comprises generating an alternating magnetic field outside the liquid container.

3. The method as claimed in claim 1, further comprising oscillating the sensor at a natural frequency.

4. The method as claimed in claim 1, comprising a step of alternating the frequency of the alternating magnetic field in a frequency range in which the natural frequency of the sensor is situated and traversing the frequency at intervals.

5. The method as claimed in claims 1, wherein the frequency of the alternating magnetic field is selected such that the sensor oscillates in air at natural frequency.

6. The method as claimed in claim 1, wherein the frequency of the alternating magnetic field is selected such that the sensor oscillates in a liquid at natural frequency.

7. The method as claimed in claim 1, further comprising a step of generating a signal representative of a level based on a decay time of the sensor oscillation.

8. The method as claimed in claim 1, wherein the frequency of the alternating magnetic field is selected to be between 20 and 100 kHz.

9. The method as claimed in claim 1, wherein the determination of the level is carried out at intervals.

10. The method as claimed in claim 9, wherein the interval is in a range of a few milliseconds to a few minutes.

* * * * *